United States Patent [19]

Lore

[11] 4,064,067
[45] Dec. 20, 1977

[54] FLUOROSURFACTANT LEVELING AGENT

[75] Inventor: Albert L. Lore, Pennsville, N.J.

[73] Assignee: E. I. Du Pont de Nemours and Company, Wilmington, Del.

[21] Appl. No.: 680,600

[22] Filed: Apr. 26, 1976

[51] Int. Cl.² .................................... B01F 17/00
[52] U.S. Cl. .............................. 252/355; 106/10; 106/271; 260/29.6 N; 260/29.6 MP; 252/357
[58] Field of Search ............ 106/2, 3, 6, 10, 270; 260/955, 28.5 R, 29.6 ME, 29.6 MN, 29.6 E, 29.6 N; 252/49.3, 32.5, 33, 355, 357

[56] References Cited

U.S. PATENT DOCUMENTS

| | | | |
|---|---|---|---|
| 2,937,098 | 5/1960 | Geen | 106/10 |
| 3,112,241 | 11/1963 | Mackenzie | 162/164 |
| 3,154,489 | 10/1964 | Du Brow et al. | 252/8.75 |
| 3,219,639 | 11/1965 | Fuchs et al. | 260/28.5 R |
| 3,328,325 | 6/1967 | Zdanowski | 260/22 |

FOREIGN PATENT DOCUMENTS

| | | | |
|---|---|---|---|
| 4,516,092 | 4/1970 | Japan | 106/10 |

*Primary Examiner*—Lorenzo B. Hayes

[57] ABSTRACT

When added thereto, certain cationic alkylammonium surfactant compounds, e.g., $C_{12}H_{25}N(CH_3)_3Cl$, enhance the leveling activity of known fluorophosphate leveling agents, e.g.,

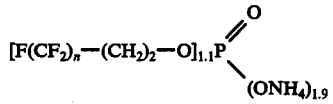

where $(CF_2)_r$ represents a mixture of groups with $C_4$–$C_{14}$ carbons, in floor polishes.

11 Claims, No Drawings

FLUOROSURFACTANT LEVELING AGENT

BACKGROUND OF THE INVENTION

1. Field of the Invention

The invention relates to additives for promoting the levelness, i.e., evenness in thickness or distribution, of waxes applied to hard surfaces as protective coatings.

2. Prior Art

Benning U.S. Pat. No. 2,597,702 (1952) shows procedures for preparing fluoroalkylphosphonic compounds which may be used for preparing the esters of this invention.

Geen U.S. Pat. No. 2,937,098 (1960) discloses the use of numerous fluorine-containing compounds as leveling agents in film-forming polishing compositions, including ammonium dodecafluoroheptyl phosphate.

Mackenzie U.S. Pat. No. 3,112,241 (1963) discloses as oil repellents when applied to solid materials the fluorophosphates used in this invention.

Zdanowski U.S. Pat. No. 3,328,325 (1967) discloses floor polishes of a type improved by the present invention.

Petrella U.S. Pat. No. 3,882,067 (1975) discloses many floor polishes improved by the addition thereto of certain fluorochemicals different from those of this invention.

SUMMARY OF THE INVENTION

It has now been found that adding to certain fluorinated phosphate esters an ammonium compound having a long chain alkyl group forms a more effective leveling agent than the ester alone. The composition can be prepared by admixture and used as an aqueous solution easily blended with known aqueous wax polish compositions.

DETAILS OF THE INVENTION

Specifically, the present invention is a mixture of:

A. at least one water-soluble cationic surfactant chosen from

[RN(CH$_3$)$_3$]Q, [RR'N(CH$_3$)$_2$]Q and

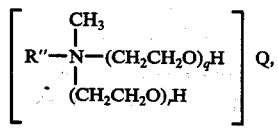

where R and R' are C$_8$–C$_{18}$ alkyl, R'' is C$_{12}$–C$_{18}$ alkyl, Q is a water-solubilizing anion such as CH$_3$OSO$_3^-$, C$_2$H$_5$OSO$_3^-$, Cl$^-$, BR$^-$, I$^-$ or other such anion, and $q$ and $r$ are integers in the range 1–25; and B. at least one water-soluble fluorophosphate ester of the formula

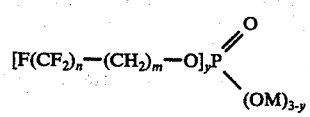

$$[F(CF_2)_n-(CH_2)_m-O]_yP\begin{matrix}\nearrow O \\ \searrow (OM)_{3-y}\end{matrix}$$

wherein M is a water-solubilizing cation such as an alkali metal, ammonium or substituted ammonium; $y$ is a number of average value from 1.0 to 2.5; and $n$ is an integer from 4 to 14 and $m$ is an integer from 1 to 16, the mole ratio of A to B being in the range 0.1/1 to 0.5/1.

It will be understood that mixtures of more than one A and/or more than one B can be used as desired.

To form the basic compositions of the invention, the precursor compounds are simply mixed together either in the dry state or in aqueous solution, e.g., at room temperature and pressure. In the mixture, the cationic surfactant is employed in the proportion of less than one mole per mole of anionic ester. Preferably, the proportion used is from 0.10 to 0.50 mole of cationic compound per mole of anionic compound. The aqueous solutions are stable and provide a convenient means for storing the mixed compounds. They need only to be added directly to the aqueous suspension or emulsion of the floor wax.

The cationic alkylammonium surfactant compounds A now used with the fluorophosphate esters may be commercially available products, including the Arquad ® and Ethoquad ® products of the Armak Chemicals Division, Chicago, Ill. 60690. The Arquads ® have the general formula

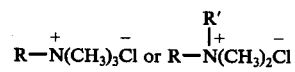

$$R-\overset{+}{N}(CH_3)_3Cl^- \text{ or } R-\overset{+}{N}(CH_3)_2Cl^-|R'$$

where R and R' are C$_8$ to C$_{18}$ alkyl groups. The Ethoquads ® have the general formula

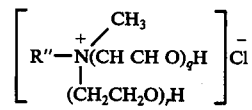

where R'' is a C$_{12}$ to C$_{18}$ fatty alkyl group and $q$ and i r range from 1 to 25. Instead of the commonly available compounds using a chloride anion, the amino compounds can be quaternized with compounds yielding Br$^-$, I$^-$, C$_2$H$_5$OSO$_3^-$, CH$_3$OSO$_3^-$, or other solubilizing anion. The C$_8$ to C$_{18}$ aliphatic amines are available commercially also.

The anionic fluorophosphates B of the composition are well known, being shown by Brace et al. U.S. Pat. No. 3,083,224 (1963). The surfactant properties of the fluorinated phosphate esters have long been recognized, and they have been broadly disclosed as leveling agents in floor waxes. The fluorophosphate esters can be prepared by reacting the corresponding polyfluoroalkanols of formula F(CF$_2$)$_n$CH$_2$CH$_2$OH with phosphorus oxychloride in the presence of an acid acceptor such as pyridine or with phosphorus pentoxide, in the optional presence of an organic liquid diluent such as benzene, toluene or xylene. One to two moles of the polyfluoroalkanol are employed per mole of phosphorus oxychloride, and the reaction is preferably effected by heating the mixture at reflux temperature, and following in general the procedural steps set forth in the various examples of U.S. Pat. No. 2,597,702.

As in Brace et al., the products may be isolated as free acid (M=H) and then converted, by neutralization with the appropriate base, into a water-soluble alkali metal (sodium or potassium), ammonium or substituted ammonium salt. As convenient bases for obtaining substituted ammonium salts may be used commonly available, water-soluble, primary, secondary or tertiary amines such as methylamine, diethylamine, monoethanolamine, diethanolamine, morpholine, triethanolamine and bis(3-hydroxypropyl)amine.

The molecular weight of the fluoroalkyl phosphate, which comprises a mixture of mono and dibasic species, is the average molecular weight. Thus, when three moles of the alcohol $F(CF_2)_nCH_2CH_2OH$ react with one mole of $P_2O_5$, a product containing equimolar amounts of $[F(CF_2)_nCH_2CH_2O]_2P(O)OH$ and $[F(CF_2)_nCH_2CH_2O]P(O)(OH)_2$ is obtained. The average molecular weight is then the average of the molecular weights of the two species.

The compositions can readily be formulated as aqueous solutions containing up to about 10-25% by weight of active ingredient (fluorophosphate salt) solids or up to 40% by weight total solids, and this amount is preferred. As noted above, the mole ratios of A to B are from 0.1/1 to 0.5/1. The composition is effective in very small amounts, ca. 50-200 parts per million based on the weight of aqueous floor wax composition, and this quantity is generally added to the aqueous wax emulsion. The leveling agent is simply mixed thoroughly with the aqueous wax base by stirring or shaking. The solid additives can be combined directly with the aqueous base, if so desired.

Zdanowski U.S. Pat. No. 3,328,325 and Petrella U.S. Pat. No. 3,882,067 disclose many representative floor wax formulations and all can be used here. The following is another typical usable formulation:

Polystyrene — 34%
Wax emulsion — 5-10%
Resin — 5-10%
Plasticizer — 2%
Water and other solvent to 100%

All of the above floor wax formulations when applied to flooring material are subject to puddling (cratering; the appearance of individual circular depressions in the surface of a film), and therefore have an uneven distribution of the wax film upon drying. Surface tension gradients in the drying film apparatus cause the cratering and eventual uneven distribution. Cratering can be diminished and more even distribution (leveling) obtained by reducing the overall surface tension of the wet wax film and by lowering the surface tension gradients in the composition as it dries. Crawlback of the edges of a coating may also occur. Application of a second coating of wax over a wax base is likely to develop a greater degree of uneven distribution than a first coat applied directly to a substrate of wood or polymeric floor covering material because the first wax coating is likely to be less wettable than the original substrate.

Materials potentially useful as leveling aids are tested by applying a wax coating to a substrate, typically a piece of black vinyl tile, drying, then applying a second wax coating composition containing the leveling aid. The dried coating is then evaluated visually. Differences in leveling can be seen very easily, and can also be evaluated by observing photographs of comparative treatments.

TEST METHOD

This method is designed to test the leveling performance of aqueous floor wax formulations. The composition to be tested is applied to a surface of waxed vinyl tile, dried and observed visually. Photographs of the surfaces are useful for making comparisons of the performance of different compositions.

I. Preparation of Tile

The surface of a tile piece of convenient size, generally 1/16 inch by 6 inches by 12 inches (0.16 × 15.24 × 30.48 cm) is first cleaned by rubbing with a solution prepared by diluting 4 ml of 28% ammonia solution to 100 ml of water. The surface is rinsed thoroughly with water, then washed with a solution of detergent such as the sodium salt of a long chain alcohol sulfate, then rinsed thoroughly again and dried with cheesecloth. The clean tile is then placed in an oven at 50°-60° C for about an hour to soften the vinyl. Upon removal from the oven the tile is placed on a flat, level surface so that it cools to provide a perfectly flat surface. The tile is then coated with a commercial wax product such as "Mop and Glo" obtainable in stores or from Lehn and Fink Products Division, Sterling Drug Co., Inc., Montvale, NJ 07645 (any other commercial self-polishing floor wax product can be used). The container of the wax product should not be shaken, to avoid bubbles. A 4 inch by 16 inch (10.16 × 40.64 cm) piece of cheesecloth is folded to 2 inches × 4 inches (5.08 × 10.16 cm) (16 thicknesses) and is thoroughly wet with the wax product. It is then applied to the tile by stroking across the grain (short dimension) to cover the surface completely two times. Slight pressure is used. There should be no bubbles on the wet surface. The waxed tile is dried in air at room temperature for 20 minutes. It is then ready for application of the test compositions.

II. Application of Wax Composition

The best applicators have been found to be Dental Cotton Rolls 1½ inches (3.81 cm) long and ⅜ inches (0.952 cm) in diameter used by dentists in their regular work. Each roll is saturated with 3 ml of the test composition, applied using a 1 ml pipette. The composition is applied to the tile by drawing the saturated cotton roll slowly down the long dimension of the tile just once, using slight pressure. It should take about 10 seconds to draw the roll down a 12 inch (30.48 cm) tile. The waxed tile is dried under ambient conditions. Normally three of four tests can be applied to each tile, and comparisons of new formulations with known good or bad compositions can afford some assurance of the correctness of the procedure in each case.

III. Grading

The dried test applications are observed by tilting the surfaces so the irregularities can be seen. The preformance is graded good, fair to poor. Good leveling is indicated by a smooth unbroken surface marred by no more than several spots which appear higher or lower than the rest of the surface. Fair leveling is indicated by no more than several small craters, with possibly a slight waviness in the surface. Poor leveling is indicated by at least two or three fairly large craters showing a wide separation of the edges.

There follow some examples illustrating the preparation of the compositions of this invention and their use as leveling agents in floor waxes. In these examples, parts and percentages are given in terms of weight. The fluorophosphate ester salt used in the examples was prepared as follows:

A suitable reactor was thoroughly dried, and 120.0 parts of the fluorinated alcohol mixture $F(CF_2)_nCH_2CH_2OH$ where $F(CF_2)_n$ is a mixture of $C_4$ to $C_{14}$ carbons was transferred thereto. The $F(CF_2)_n$ mixture was mainly $C_6$ and $C_8$ groups and the alcohol had an average molecular weight of about 430. Dry nitrogen gas was bubbled slowly up through the charge, and the temperature was adjusted to about 60° C. Then 18.0 parts of phosphoric anhydride was sifted into the alcohol slowly and steadily over about 45 minutes. The temperature of the charge was raised to about 70° C and held for 20 hours. After cooling to 60°–65° C 76.0 parts of isopropyl alcohol was added, and the charge agitated at 45°–55° C for an hour. At this point 133.3 parts of deionized water was added to the charge, and the temperature again adjusted to 55°–60° C. Then 20.0 parts of 30% aqueous ammonia solution was added to neutralize the charge, and agitation was continued for 1 hour at 50°–55° C. The charge was cooled to 25°–30° C and the pH adjusted to 7.0–8.0 by adding aqueous ammonia solution as necessary. The formula of the resulting fluorophosphate ester thus produced was

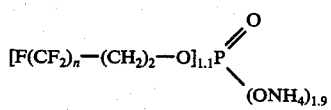

where $n$ is a mixture of $C_4$–$C_{14}$ groups. The percentage solids of the charge was adjusted to 35.0 ± 1% by adding water.

EXAMPLES 1–6

A number of Examples was run using a 35% aqueous solution of the fluorophosphate ester

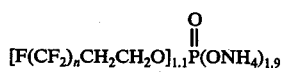

as prepared above and a 50% aqueous solution of $[C_{12}H_{25}N^+(CH_3)_3]Cl^-$ (Arquad ® 12–50). The prepared compositions were used to dilute by direct addition and stirring a wax base aqueous composition containing wax, surfactant, polymer, plasticizer and resin, but lacking any fluorosurfactant. The composition used is believed to contain, beside about 90% water, a modified acrylic polymer, polyethylene, a phosphate ester plasticizer, and a small amount of a water-miscible solvent such as ethylene glycol.

In all tests, the combined surfactant composition was added to the wax base at a level of 50 parts per million by weight. The prepared dilutions were then tested for leveling effectiveness by the test procedure outlined above, a tile initially covered with "Mop & Glo" being used. Comparison was also make with the wax base without fluorosurfactant and with an accepted commercial product known to exhibit satisfactory leveling in use. The results are shown in Table I, leveling efficiency being obtained visually. Examples 1 and 2 are considered to have too low a percentage of amine.

TABLE I

| | Prepared Composition | | Mole Amine | Wax Product as | |
|---|---|---|---|---|---|
| Example | % Fluorophosphate | % Amine | per Mole Fluorophosphate | Applied: % of Combined Surfactant | Leveling Efficiency |
| 1 | 34.7 | 0.43 | 0.03 | 0.005 | Fair |
| 2 | 34.4 | 0.86 | 0.06 | 0.005 | Fair |
| 3 | 33.8 | 1.69 | 0.11 | 0.005 | Fair |
| 4 | 32.7 | 3.27 | 0.22 | 0.005 | Fair to Good |
| 5 | 30.7 | 6.14 | 0.45 | 0.005 | Fair to Good |
| 6 | 35.0 | — | — | 0.005 | Fair |
| Blank - no surfactant | | | | | Poor |
| Commercial Wax Product | | | | | Good |

EXAMPLES 7–9

Three representative floor wax compositions were tested as described previously, with the addition of varying amounts of a fluorosurfactant leveling agent of the invention. These compositions are believed to fall within the metal-modified acrylic material of Zdanowski U.S. Pat. No. 3,328,325.

The agent was prepared by mixing 5.0 parts of the 35% aqueous solution of

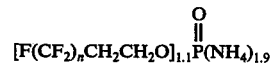

prepared above and 1 part of the compound

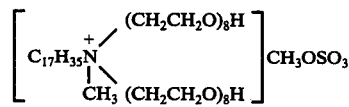

prepared by ethoxylation of tallowamine and quaternization with dimethyl sulfate. After mixing, the solids content of the composition was adjusted to 40% by adding water. The product contained 0.325 mole of the active cation for each mole of active anion.

The aqueous compositions used in these examples were as follows:

EXAMPLE 7

| Ingredient | Parts |
|---|---|
| "Rhoplex" B-505 (1) | 80.0 |
| Appearance - milky liquid | |
| Solids - 25% | |
| Ionic charge - anionic | |
| "Acrysol" 527 (25%) (2) | 5.0 |
| "AC" 540 (N) (25%) (3) | 15.0 |

Notes:
(1) Zinc-crosslinked modified acrylic copolymer from the Rohm & Haas Corporation.
(2) A soluble acrylic copolymer.
(3) Allied Chemical Co., Plastics Division, Morristown, New Jersey.

| Ingredient | Parts |
|---|---|
| Diethylene glycol monomethyl ether | 1.0 |
| Dibutyl phthalate | 1.7 |
| Tributoxyethyl phosphate | 1.7 |
| Defoaming surfactant SWS-211 (4) | 0.025 |
| Formalin (37%) | 0.15 |

Note:
(4) Stauffer-Wacker-Silicone Corp., Adrian, Mich.

EXAMPLE 8

| Ingredient | Parts |
| --- | --- |
| "Rhoplex" B-924 (5) | 80.0 |
| Appearance - milky liquid | |
| Solids - 15% | |
| Ionic charge - anionic | |
| "Acrysol" 527 (15% solids) | 5.0 |
| "AC" 540 (N) (15% solids) | 15.0 |
| Tributoxyethyl phosphate | 1.0 |
| Dibutyl phthalate | 1.0 |
| Defoaming surfactant SWS-211 | 0.0125 |
| Diethylene glycol monomethyl ether | 4.0 |
| Formalin (37%) | 0.15 |

Note:
(5) Zinc-crosslinked modified acrylic copolymer from the Rohm & Haas Corporation.

EXAMPLE 9

| Ingredient | Parts |
| --- | --- |
| "Rhoplex" B-832 (6) | 75.0 |
| Appearance - milky liquid | |
| Solids - 25% | |
| Ionic charge - anionic | |
| "Acrysol" 527 (25% solids) | 10.0 |
| Polyethylene emulsion (25% solids) | 15.0 |
| Diethylene glycol monomethyl ether | 6.6 |
| Tributoxyethyl phosphate | 1.65 |
| Defoaming surfactant SWS-211 | 0.02 |
| Formalin (37%) | 0.15 |

Note:
(6) Zinc-crosslinked modified acrylic copolymer from the Rohm & Haas Corporation.

TABLE II
WAX LEVELING

| Example | Surfactant Level 50 ppm | 100 ppm | 150 ppm | Control No Surfactant |
| --- | --- | --- | --- | --- |
| 7 | Sl. better than control | Fair, some crawling (7) | Good, trace crawling | Poor, crawlback (7) |
| 8 | Sl. better than control | Fair to good, some uncovered surface | Good, trace uncovered surface | Fair, some crawlback |
| 9 | No crawlback, some uncovered surface | Same Same | Same, less uncovered surface | Poor, much uncovered surface |

Note:
(7) Crawling or crawlback occurs when the edges of a wax coating applied to a substrate recede into the body of the wax instead of maintaining complete coverage.

I claim:

1. A leveling composition consisting essentially of a mixture of:

A. at least one water-soluble cationic surfactant chosen from $[RN(CH_3)_3]Q$, $[RR'N(CH_3)_2]Q$ and

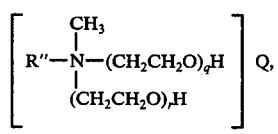

wherein
   R and R' are $C_8$-$C_{18}$ alkyl, R" is $C_{12}$-$C_{18}$ alkyl, Q is a water-solubilizing anion and $q$ and $r$ are integers in the range 1-25; and B. at least one anionic water-soluble polyfluoroalkyl phosphate of the formula

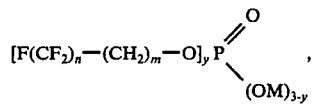

wherein M is a water-solubilizing cation, $y$ is a number of average value from 1.0 to 2.5, $n$ is an integer from 4 to 14 and $m$ is an integer from 1 to 16,
   the mole ratio of cationic A to anionic B being in the range 0.1/1 to 0.5/1.

2. A leveling composition of claim 1 wherein Q is chloride and M is ammonium.

3. A leveling composition of claim 1 wherein Q is $CH_3OSO_3^-$ and M is ammonium.

4. A leveling composition of claim 1 wherein the water-soluble cationic surfactant is $$\left[ C_{17}H_{35}-\overset{CH_3}{\underset{(CH_2CH_2O)_8H}{N}}-(CH_2CH_2O)_8H \right] CH_3OSO_3.$$

5. A leveling composition of claim 1 wherein the water-soluble polyfluoroalkyl phosphate is

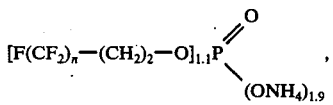

$(CF_2)_n$ representing a mixture of $C_4$-$C_{14}$ carbons.

6. A leveling composition of claim 1 wherein the the water-soluble cationic surfactant is $[C_{12}H_{25}N(CH_3)_3]Cl$ and the water-soluble polyfluoroalkyl phosphate is

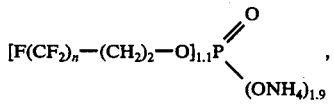

$(CF_2)_n$ representing a mixture of $C_4$-$C_{14}$ carbons.

7. A leveling composition of claim 1 wherein the water-soluble cationic surfactant is

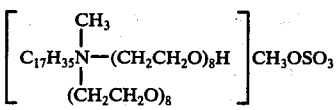

and
the water-soluble polyfluoroalkyl phosphate is
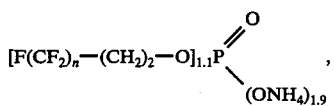
$(CF_2)_n$ representing a mixture of $C_4$–$C_{14}$ carbons.
8. A leveling composition of claim 1 in aqueous solution.
9. An aqueous solution of claim 8 containing around 40% by weight solids.
10. A leveling composition of claim 6 in aqueous solution.
11. A leveling composition of claim 7 in aqueous solution.
* * * * *